United States Patent [19]
Simpson et al.

[11] 3,758,857
[45] Sept. 11, 1973

[54] AUTOMATIC TESTING APPARATUS

[75] Inventors: Sylvester Allan Simpson, Tipp City; Howard W. Smith, West Carrollton, both of Ohio

[73] Assignee: A. D. Smith Corporation, Milwaukee, Wis.

[22] Filed: Dec. 23, 1971

[21] Appl. No.: 211,427

[52] U.S. Cl................... 324/158 MG, 324/73 R
[51] Int. Cl...................... G01r 31/00, G01r 15/12
[58] Field of Search.............. 324/158 MG, 73 R, 324/73 AT, 55, 158 SY

[56] References Cited
UNITED STATES PATENTS
3,182,797  5/1965  Palmer .................... 324/73 AT

*Primary Examiner*—Alfred E. Smith
*Assistant Examiner*—Ernest F. Karlsen
*Attorney*—Andrus, Sceales, Starke & Sawall

[57] ABSTRACT

An automatic electric motor testing facility provides a plurality of carriers for carrying motors to a plurality of testing stations at which tests are performed. A memory arm having two levels of memory and an attached reflector assembly is connected to each carrier for selectively actuating each testing sequence through photoelectric transducers located at each testing station. Memory arm control means located at each test station selectively control the memory level of each memory arm in response to the test results. A tabulating punch provides a test record at each carrier while tabulating counters at the test control further record test results. The test control also provides a resistor bank having a plurality of resistive elements which are selectively code connected to one another, to a power source, and to an output circuit by a data card reader for providing a plurality of presettable electrical outputs for automatically controlling the testing of the electric motors.

15 Claims, 7 Drawing Figures

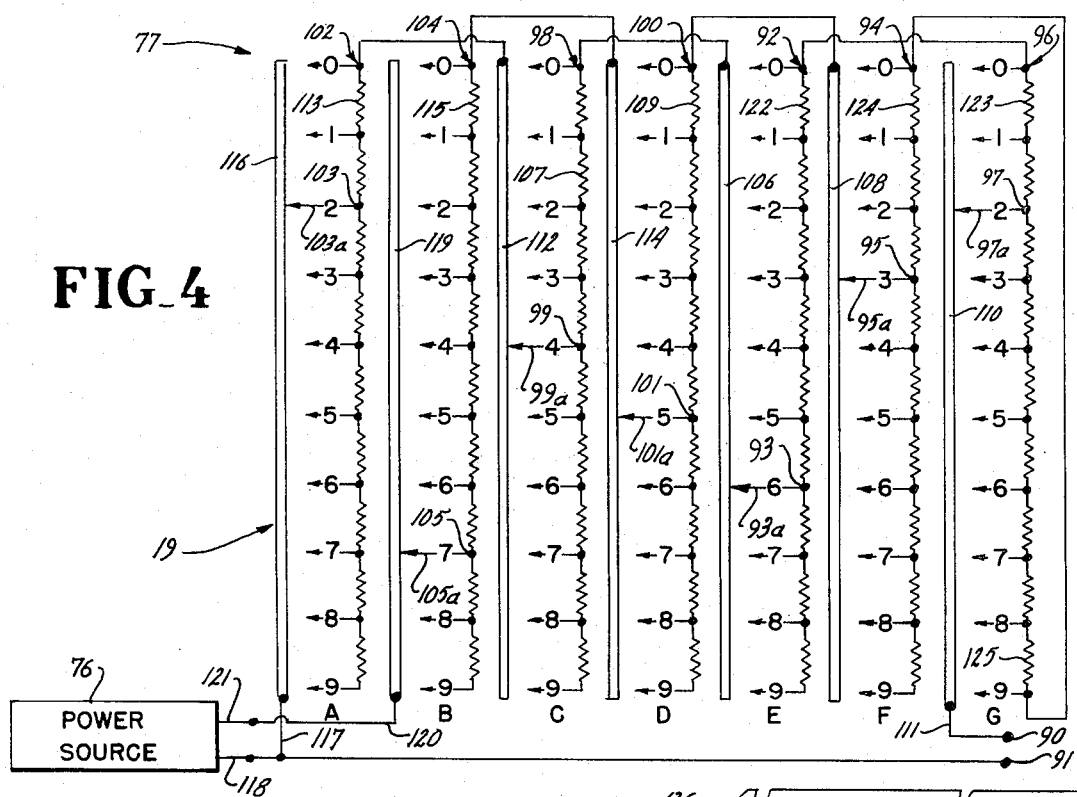
FIG_4
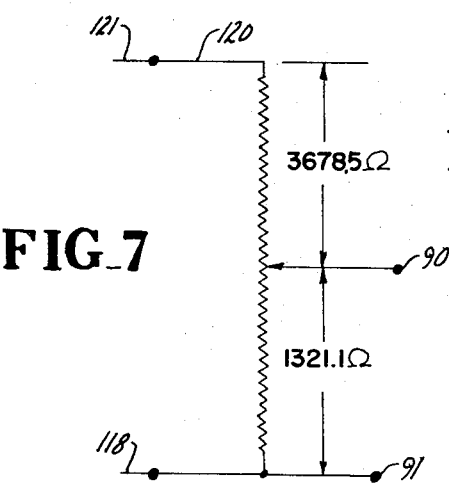
| RESISTIVE COLUMN | PIN | OHMS | RESISTIVE COLUMN | PIN | OHMS |
|---|---|---|---|---|---|
| 102 | 2 | 1.0 | 104 | 7 | 3.5 |
| 98 | 4 | 20.0 | 100 | 5 | 25.0 |
| 92 | 6 | 300.0 | 94 | 3 | 150.0 |
| 96 | 2 | 1000.0 | 96 | 2 | 3500.0 |
|   |   | 1321.0 |   |   | 3678.5 |
FIG_6
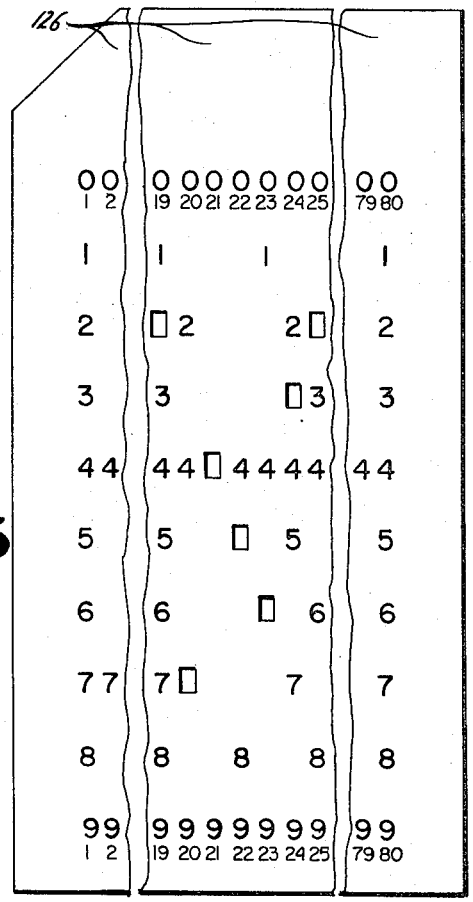
FIG.5
FIG_7

AUTOMATIC TESTING APPARATUS

BACKGROUND OF THE INVENTION

This invention relates to an apparatus for performing a plurality of operations on an article or on a plurality of articles and includes an apparatus for selectively providing a plurality of code presettable electrical outputs.

Presettable limit switches or limit tabs have long been employed in conveyor assembly or processing operations wherein workmen manually preset tabs according to the particular assembly or process desired. Once manually preset, such limit switches or tabs are effective for establishing a predetermined sequence of operation.

Data card readers have also been utilized for supplying digital output signals which must, in turn, be converted through logic circuits and the like to analog voltages to control test or processing operations. One system, however, employs a control card having printed circuit connections thereon for selectively contacting terminal points of only a single group of series connected resistors which are continually electrically connected to a power source.

SUMMARY OF THE INVENTION

This invention relates to an apparatus for performing a plurality of operations on an article and includes an apparatus for selectively providing a plurality of code presettable outputs.

In accordance with the preset invention, an automatic apparatus guides a carrier means through a plurality of stations with a control means electrically connected for performing a plurality of operations on an article. A memory means is connected to the carrier means and is operatively connected to the control means and provides two levels of memory for controlling the plurality of operations. A memory control means is located at one or more stations and is electrically connected to the control means for selectively transferring the memory means from one memory level to another memory level in response to the operation taking place at the one or more stations.

In a further aspect of the invention, a record means is removably attached to the carrier means while a marking means which is electrically connected to the control means selectively provides a record on the record means in response to the operation of the memory control means.

In another aspect of the invention, a plurality of carrier means are employed for moving a plurality of articles to the plurality of stations. In such an embodiment, the plurality of carrier means each have a memory means connected thereto. A highly satisfactory quality control is provided by a tabulating means operatively connected to the plurality of memory means for counting the number of memory level transfers.

In a preferred embodiment of the invention, an automatic apparatus guides a carrier means through a plurality of motor testing stations with a test control means electrically connected for performing a plurality of tests on an electric motor. A memory means is operatively connected to the test control means and provides a first memory level for imitating a motor test and a second memory level for by-passing a motor test. A memory control means is located at one or more motor testing stations and is electrically connected to the test control means for selectively transferring the memory means from one memory level to another memory level in response to the test results of the electric motor.

In a specific embodiment of the invention, the automatic electric motor testing apparatus provides a continuous closed-loop track having an electrical energy transferring circuit connected therewith. One or more carrier apparatus are movably connected to the track for carrying electric motors to a plurality of motor testing stations defined at preselected locations on the track. Electrical conductors are provided by each carrier means for selectively connecting the electric motors to the electrical track circuit which, in turn, is electrically connected to a test control means for selectively providing a plurality of tests on the electric motors. A memory arm having an attached reflector assembly is pivotally connected to each carrier apparatus and is selectively located in either an upper or lower position. A plurality of photoelectric transducers are located at the plurality of testing station and are electrically connected to the test control means. Such transducers are positioned to be selectively actuated by the reflector assemblies when the corresponding memory arms are in the upper position for initiating a testing sequence at each corresponding station. A plurality of memory arm control means are located at the plurality of testing stations and are electrically connected to the test control means for selectively transferring the memory arms between upper and lower positions in response to the test results of the motors being tested.

In another aspect of the invention, the carrier apparatus provides a pair of electrical contacts or prongs which are spring-biased toward each other while a portion of the memory arm consists of an electrical conductor which is adapted to be received by the contacts with the arm in the upper position to complete an electrical circuit between the test control means and the electric motor under test. The selective placement of the memory arm in the lower position separates the memory arm portion from the contacts for disconnecting the circuit.

Retractable pistons have been advantageously employed within the memory arm control means to selectively control the memory arms. One form of operation normally positions the piston projection or outer end within the traveling path of the memory arm and is retracted in response to the conclusion of a successful test by the operation of the test control. A test failure, of course, would retain the piston projection in the extended position to transfer the memory arm from an upper position to a lower position. The memory control means have advantageously been placed at the terminating end of each testing station.

A pass and a failure photoelectric transducers preferably are located adjacent to the closed loop track and adjacent to the terminating end of the final testing sequence. The pass and failure transducers are electrically connected to the test control means with the pass transducer actuated by each reflector assembly located in the upper position and the failure transducer actuated by each reflector assembly located in the lower position. A first tabulating counter is connected to the pass transducer for totalizing the number of successfully tested motors while a second counter is connected to the failure transducer for tabulating the number of consecutive unsuccessfully tested motors. The second counter is preferably of the automatically resettable type which is reset in response to a successfully tested motor. An alarm is also preferably connected to the second counter and is actuated in response to a predetermined number of consecutive testing failures.

In another aspect of the invention, an apparatus is provided for selectively providing a plurality of presettable electrical outputs and includes first, second and third pluralities of impedance means inter-connected for providing a first, second and third pluralities of impedance points, respectively. A circuit connecting means is connected to the first, second and third pluralities of impedance points and provides a coded means for electrically connecting a first predetermined number of the first impedance means to a power means and to one of the third impedance means while further electrically connecting a second predetermined number of the second impedance means to the power means and to one of the third impedance means. The circuit connecting means also includes an output means which is electrically code connected to a selected impedance point of the third plurality of impedance points so that a third predetermined number of the third impedance means are electrically connected to the output means and to the selected first impedance means while a fourth predetermined number of the third impedance means are electrically connected to the output means and to the selected second impedance means.

In a preferred form of the invention, the circuit connecting means includes a plurality of pins connected to the plurality of impedance points with each point having a corresponding pin. A plurality of brushes are code connected to predetermined pins fo selectively interconnecting the predetermined numbers of the first, second and third impedance means.

In another form of the invention, the apparatus for selectively providing a plurality of presettable electrical outputs provides first, second and third columns each having a plurality of serially connected impedance elements with junction points therebetween. The first impedance element of the first column is connected to the first impedance element of the third column while a first impedance element of the second column is connected to the last element of the third column. The circuit connecting means provides a coded input means, an output means and a plurality of pins connected to the plurality of junction points. The connecting means further provides a plurality of brushes including a first brush for connecting a code predetermined pin and junction point in the first column to the power source, a second brush for connecting a code predetermined pin and junction point in the second column to the power source, and a third brush for connecting a code predetermined pin and junction point in the third column to the output means.

Additional brushes are utilized if additional columns are employed each having a plurality of serially connected impedance elements with junction points therebetween. For example, a first impedance element of a fourth column would be electrically connected to the first brush while the first impedance element of a fifth column would be electrically connected to the second brush. A fourth brush would therefore be utilized to connect a code predetermined pin and junction point in the fourth column to the power source while a fifth brush would connect a code predetermined pin and junction point in the fifth column to the power source. Additional columns and brushes may therefore be added as desired to ensure a proper range of output selection and accuracy.

In a preferred embodiment, the impedance of certain impedance elements differ from other elements. As more fully described hereinafter, the impedance elements of the fourth and fifth columns, for example, will provide a different impedance than the impedance elements of the first, second and third columns. Also, the impedance elements of the second and third columns each provide a different impedance than the impedance elements of the first, fourth and fifth columns. It is apparent that the impedance values of the elements in each column may differ from elements in other columns and it is not beyond the scope of the invention to differ the impedance of some or all elements within each column.

The invention disclosed herein thus provides a highly efficient and completely automatic apparatus which may advantageously be employed as a electric motor testing facility.

BRIEF DESCRIPTION OF THE DRAWINGS

The drawings furnished herewith illustrate the best mode presently contemplated by the inventors and clearly disclose the above advantages and features, as well as others which will be readily understood from the detailed description thereof.

In the drawings:

FIG. 4 is a schematic drawing showing the plurality of impedance means and the data card reader utilized in the control console of FIG. 2 and provides a means for selectively providing a plurality of presettable electrical outputs;

FIG. 5 shows an illustrated data card programed for use with the data card reader shown in FIG. 4;

FIG. 6 shows a chart illustrating an example of the operative effect of the programed card shown in FIG. 5 for completing circuit connections within the circuit schematic shown in FIG. 4; and FIG. 7 shows a schematic drawing of the equivalent circuit provided by the circuit schematic shown in FIG. 4 under the illustrated example provided by the card shown in FIG. 5.

DESCRIPTION OF THE PREFERRED
ILLUSTRATED EMBODIMENT

Figure 1:
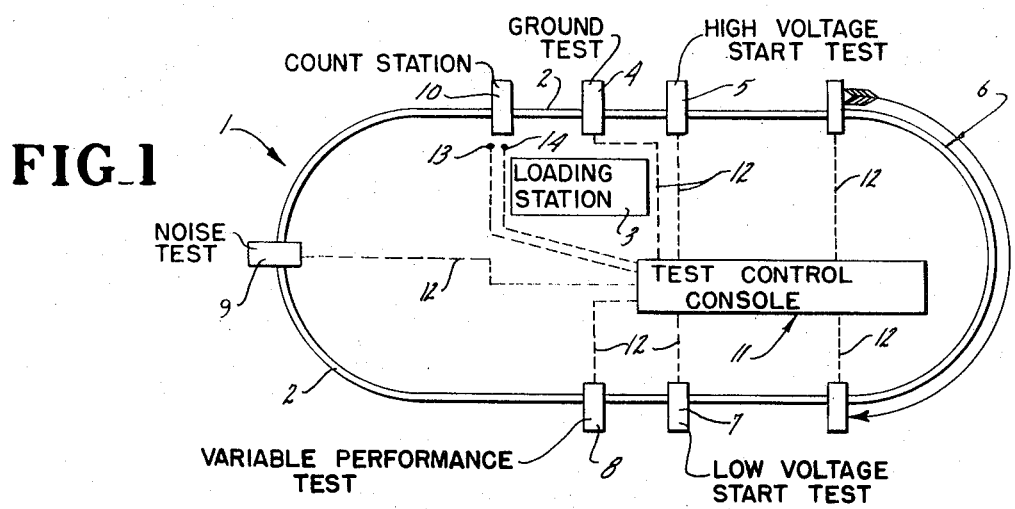
FIG. 1 is a floor layout of an automatic test facility illustrating the various testing stations and including a control console coupled to control and monitor the plurality of test sequences.

Referring to the drawings and particularly FIG. 1, the illustrated embodiment of the invention includes an automatic testing facility 1 in which articles to be tested are transported by a continuous track through a plurality of testing and operating stations to ensure proper performance of such articles and further to distinguish unacceptable articles which are rejected. The testing facility 1 is particularly useful for testing electric motors.

As specifically shown in FIG. 1, a closed loop track 2 receives motors from a loading station 3 and automatically transports such motors through, a plurality of testing and operating stations including a ground test station 4, a high voltage start testing station 5, a motor conditioning station 6, a low voltage start testing station 7, a variable performance testing station 8, a noise testing station 9, and a counting station 10 whereat the tested motors are removed and segregated according to acceptable and unacceptable motors. A test control console 11 is electrically coupled to the plurality of testing and operating stations as illustrated by the dotted lines 12 which will be described in greater detail hereinafter. The test console 11 is further connected to a pair of photoelectric transducers which include sensors 13 and 14 which provide a totalizing registration of unacceptable and acceptable tested motors as will be described in greater detail hereinafter.

Figure 2:
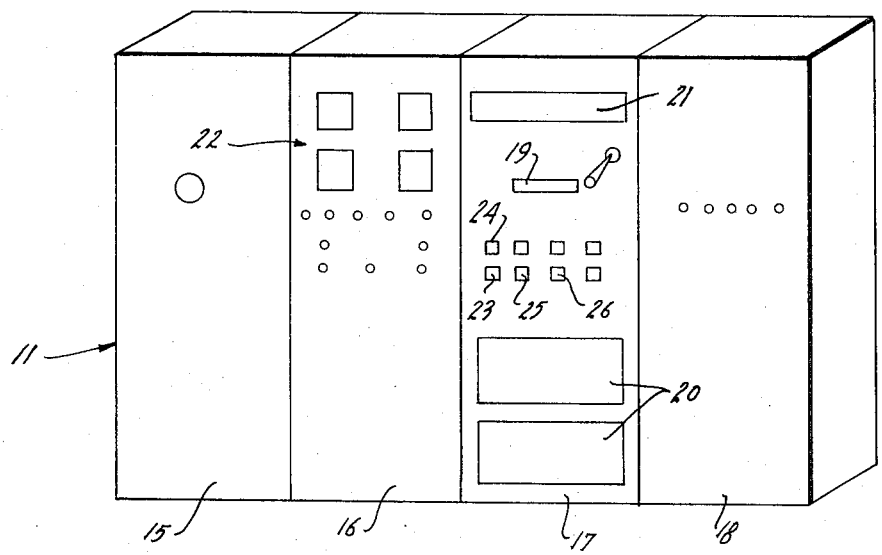
FIG. 2 is a pictorial view of the control console shown in FIG. 1 and includes a data card reader.

FIG. 2 shows the test control console 11 which provides a plurality of sections including a power cabinet 15, a meter cabinet 16, a control and regulating cabinet 17, and a track control cabinet 18. Of particular interest, the control and regulating cabinet 17 includes a data card reading section 19 adapted to receive a programed data card for providing analog voltages for controlling the testing sequences given the plurality of motors passing through the test facility 1. The cabinet 17 also contains voltage regulating sections 20 which are controlled by the output of the data reader 19 and a readout section 21 which is also responsive to the output of the data card reader 19 for designating the type of apparatus under test.

The meter cabinet 16 provides a plurality of meters 22 for monitoring the voltages and currents utilized in each testing sequence.

The meter cabinet 17 contains an automatically resettable counter 23 which is responsive to the operation of the sensor 13 and totalizes the number of consecutive rejects of the motors being tested which is reset upon sensing a successfully tested motor. An alarm 24 is coupled to counter 23 and is adapted to be actuated in response to a predetermined number of consecutive rejects as sensed by the counter 23. A counter 25 is responsive to the operation of sensor 14 for counting the number of acceptable motors that have passed through the testing stations in test facility 1. A counter 26 is also shown which may be utilized for counting the unsuccessful tests at a particular station and, of course, counters may be employed for each test. The operation of counters 23, 25 and 26 together with alarm 24 therefore provides an instantaneous quality control for the entire continuous testing operation.

Figure 3:
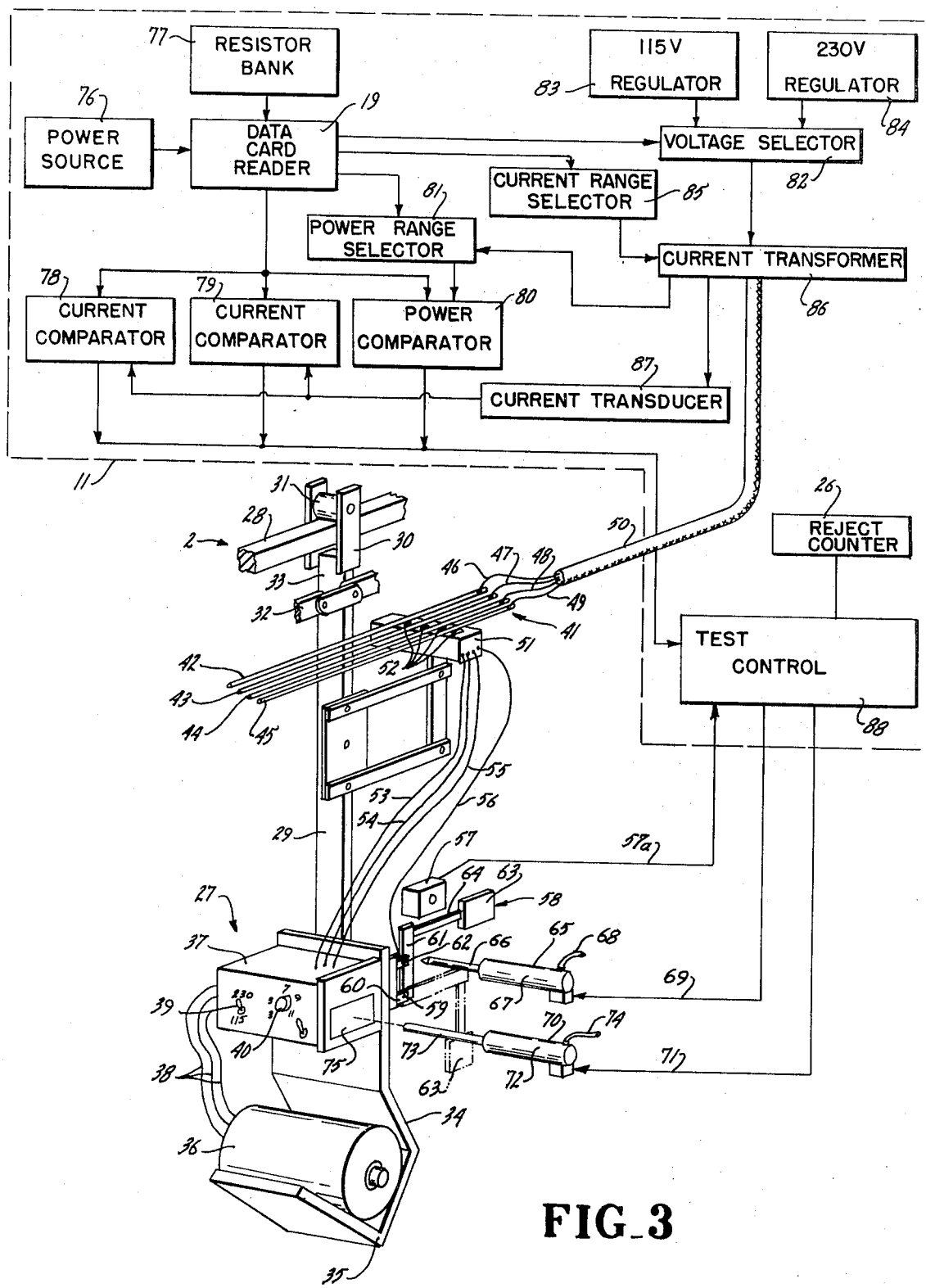
FIG. 3 is a perspective view of a broken away portion of the testing facility shown in FIG. 1 showing a track assembly and carriage, an electric motor under test, a memory mechanism, a memory control means, a record and a marking means together with the associated electrical connections to the contol circuit of the control console which is diagrammatically illustrated in part in block form.

With reference to FIG. 3, a portion of the test control console is shown enclosed at 11 together with a portion of the track 2 having a motor carriage assembly 27 movably connected thereto. FIG. 3 illustrates the testing sequence at the variable performance testing station 8 and only the control circuitry utilized at that station has been illustrated. It is to be understood that additional circuitry could be utilized or substituted in accordance with the desired test or operation to be performed by those skilled in the art while still utilizing applicants' invention. Specifically, the track 2 includes a rail 28 upon which the motor carriage assembly 27 is movably connected through a carriage arm 29 which extends upwardly from the carriage assembly 27 and provides an upper end which terminates in a yoke 30 having a guide wheel 31 positioned therein and adapted to rotatably engage the rail 28. A chain 32 is connected to the upper portion 33 of arm 29 and is suitably driven (not shown) to move the motor carriage assembly 27 along the rail 28 of the continuous track 2 thereby transferring the assembly 27 through the plurality of testing and operating stations such as illustrated in FIG. 1.

The motor carriage assembly 27 further provides a carriage 34 having a V-shaped trough 35 adapted to hold an apparatus which is to be tested such as an electric motor 36. A power control box 37 is connected to carriage 34 and is electrically connected to the motor 36 through a plurality of electrical connectors 38. The power control box 37 further provides a manual control which may be preset to provide a desired voltage range through a switch 39 and a desired capacitance through a switch 40.

A plurality of power conductors 41 are shown mounted below rail 28 and run coextensively therewith at each of the plurality of testing and operating stations for providing testing and operating power to the electric motor 36. In a preferred form of the invention, a conductor 42 provides a ground potential, a conductor 43 provides for up to 115 volts of potential, a conductor 44 provides for up to 230 volts of potential, and a conductor 45 provides for a common return. The utilization of conductors 42–45 is analogous to a conventional industrial power application well known to those skilled in the art. The conductors 42–45 are shown connected to the control console 11 for a particular testing or operating station by the electrical wires 46–49 which are shielded by a cable 50.

Testing and operating power is supplied to the motor carriage assembly 27 and particularly to the power control box 37 through a pantograph type of structure 51 supported by carriage arm 29 which provides a plurality of shoes or contacts 52 which slidably engage and make electrical contact with the solid conductors 42–45. Specifically, the plurality of shoes 52 are electrically connected to the power control box 37 by a plurality of electrical leads 53–56 which are therefore respectively electrically connected to the plurality of conductors 42–45. Thus, testing and operating power is selectively supplied to the motor 36 carried by the motor carriage assembly 27 through the plurality of testing and operating stations according to the control provided by the control console 11, as will be further described hereinafter.

A transducer 57 is located at testing station 8 and includes a photoelectric transmitter for supplying a light beam and a photoelectric receiver which provides an electrical output when sensing such a light beam. The transmitter of transducer 57 is positioned at station 8 to project a light beam across the traveling path of carriage assembly 27 while the receiver is electrically connected to the control console 11 by a conductor 57a. Photoelectric light transmitters and receivers are well known to those skilled in the art and further description thereof is deemed unnecessary. Transducers, such as 57, may be employed at each testing and operating station if desired.

A memory apparatus 58 is pivotally connected to the carriage 34 by a pin 59 and is adapted to be positioned to intercept the light beam provided by transducer 57. Specifically, an electrically conducting projection 60 is connected to carriage 34 and is further electrically connected to the power control box 37. A memory element or arm 61 is pivotally connected to projection 60 by the pin 59 and is releasably held in an upper or vertical position by a pair of inwardly biased prongs 62. The prongs 62, arm 61 and projection 60 are formed of an electrically conductive material so that an electrical circuit exists between prongs 62 and projection 60 when the arm 61 is in the upper position. A reflector assembly 63 is connected to the memory arm 62 by a perpendicular extension 64 and is aligned to intercept the light beam provided by transducer 57 when the arm 61 is in the upper memory position. The lead 56 is connected to one of the prongs 62 on the motor carriage assembly 27 and is connected to conductor 45 through one of the plurality of shoes 52. The projection 60, in turn, is electrically connected to the power control box 37 and thus subsequently to the motor 36 through one of the plurality of connectors 38. The memory arm 61 therefore completes the common return circuit between the motor being tested and the test control console when in the upper position and disconnects such circuit when in the lower position.

A memory control apparatus 65 is shown located at testing station 8 and provides an axially movable piston 66 which is removably positioned within the traveling path of a portion of arm 61. A cylinder 67 is connected to a compressed air source (not shown) by an air supply hose 68 and is also electrically connected to the test control console through conductor 69. In operation, air is applied to cylinder 67 in response to a control signal provided by control console 11 to axially retract piston 66 partially into cylinder 67 thereby allowing memory arm 61 to pass through testing station 8 in the upper position. Alternatively, the test control may selectively retain piston 66 in the extended position thereby disengaging arm 61 from prongs 62 and permitting the memory arm 61 to freely rotate to the lower position as shown in FIG. 3 in phantom construction. Memory control apparatus such as illustrated at 65 may be employed at other testing and operating stations as desired.

A marking means 70 is also located at testing station 8 and is electrically connected to the control console by a conductor 71 and includes a cylinder 72 and an axially movable punch 73. The punch 73 is connected to be selectively operated by compressed air supplied through an air supply hose 74. A record means 75 is removably attached to the carriage assembly 27 and particularly to the control box 37. The record means 75 is illustrated as a card having test station indicia located thereon and is located or positioned to be selectively perforated by the punch 73 in response to a control signal received from control console 11. The marking means 70 may therefore be selectively operated to record a particular testing condition such as the failure of a particular test. Marking means such as illustrated at 70 may be employed at other testing and operating stations as desired.

A portion of the control circuitry of the control console 11 is shown in block diagrammatic form in FIG. 3 and specifically relates to the variable performance test performed at testing station 8. Specifically, the data card reader 19 is effective for selectively coupling or connecting a voltage source 76 to a resistor bank 77 and further for interconnecting a code predetermined pluralities of impedance means within bank 77 to provide a plurality of electrical outputs, as will be more fully described hereinafter. In operation, the data card reader provides a preselected analog voltage to a pair of current comparators 78 and 79 and to a power comparator 80. The data card reader 19 also supplies an analog signal to a power range selector 81 which, in turn, furnishes a signal to the power comparator 80.

The data card reader 19 is further effective for supplying the proper electrical testing parameters to the motor carriage assembly 27 and particularly to the electrical motor 36 being tested by supplying an analog control signal to a voltage selector 82 which, in turn, is coupled to a 115 volt regulator 83 and a 230 volt regulator 84. The data card reader 19 also supplies an analog control signal to a current range selector 85. The voltage selector 82 and the current range selector 85 are coupled to a current transformer 86 which, in turn, is connected to the motor carriage assembly 27 by a power cable 50 and the leads 46–49. Thus, the variable performance test performed at testing station 8 receives operating power under the desired testing parameters as controlled by the analog signals supplied by the data card reader 19.

The current and voltage supplied by transformer 86 to testing station 8 is monitored with proportional signals supplied to the power range selector 81 which, in turn, supplies a proper analog signal to the power comparator 80. In addition, a proportional signal is supplied to a current transducer 87 which, in turn, supplies a current indicative signal to the current comparators 78 and 79. The comparators 79–80 therefore compare the desired operating characteristics or parameters supplied by the data card reader 19 to the actual operating characteristics as sensed at the current transformer 86 to automatically provide an indication of an acceptable or unacceptable test. The comparators 78–80 are coupled to a test control 88 which, in turn, initiates and terminates (not shown) the testing sequence at station 8 and is also coupled (not shown) to initiate operation of the comparators 78–80. The counter 26 is also shown connected to test control 88 for tabulating the testing failures at testing station 8.

The operation of the automatic testing apparatus as illustrated in FIGS. 1–3 will be initially described with respect to the variable performance test at station 8. Assuming that motor 36 successfully completed the low voltage starting test at station 7, the motor carriage assembly 27 will approach test station 8 with memory arm 61 in the upper position. The reflector assembly 63 will therefore be positioned to intercept and reflect the light beam provided by transducer 57. The sensor in transducer 57 will thus receive the reflected light beam and provide an electrical control signal to the control console 11 through conductor 57a and particularly to test control 88 to initiate a testing sequence and further to initiate the operation of the comparators 78–80.

The motor 36 is given a variable performance test while passing through station 8 and is, in a preferred embodiment, tested at maximum and minimum current conditions, maximum power conditions, and further ground tested. The control console 11 will thereupon automatically ascertain and distinguish between a successful and an unsuccessful test of motor 36 at station 8 through the operation of the comparators 78–80 which compare the actual electrical conditions of motor 36 under test with desired analog parameters as supplied by data reader 19.

Upon completion of a successful test at station 8, the test console 11 through the test control 88 sends a control signal to the memory control apparatus 65 for retracting the piston 66 to allow the carriage assembly 27 to pass from station 8 with the memory arm 61 in the upper position. Thus the completion of a successful test at station 8 will permit the carriage assembly 27 to proceed to the noise testing station 9 with the memory arm 61 in the upper position so that the reflector assembly 63 remains in a position to intercept a light beam and therefore actuate a transducer at station 9 which is similar to transducer 57 for initiating the noise test. It is noted that the selective retention of memory arm 61 in the upper position also maintains an electrical circuit connection between the control console 11 and the motor 36 through the prongs 62, the memory arm 61 and the projection 60. Failure of the variable performance test by motor 36 at station 8 allows the piston 66 to remain in the extended position and engage the upper portion of memory arm 61 while the carriage assembly 27 is leaving station 8. The extended piston 66 therefore disengages memory arm 61 from prongs 62 to permit arm 61 to freely rotate about pivot pin 59 to a lower position as illustrated in phantom in FIG. 3.

The transfer of memory arm 61 from the upper to the lower position in response to a test failure at station 8 also disengaes the electrical circuit connection between prongs 62 and projection 60 and therefore open circuits the common return connection between motor 36 and the control console 11.

The test control 88 of console 11 upon sensing a test failure at station 8 transmits a control signal to the marking means 70 by conductor 71 to perforate the record means or card 75 at a preselected location thereon to clearly indicate that the test failure occured at station 8. Specifically, the marking means operates selectively in response to a control signal supplied by test control 88 to supply compressed air to cylinder 72 thereby axially extending punh 73 to perforate the card 75.

Once failing a particular test, the motor carriage assembly 27 will pass through succeeding station such that motor 36 will not be subjected to further operations or tests. With memory arm 61 in the lower position following an unsuccessful test, the reflector assembly 63 will be unable to intercept light beams of transducers located at subsequent stations similar to transducer 57.

Thus, an unsuccessful test at station 8 will automatically transfer the memory apparatus 58 from one memory level to a second memory level thereby allowing motor 36 to proceed through station 9 without being tested.

The arrival of carriage assembly 27 at the counting station 10 permits a tabulation of the total number of successfully tested motors and of the consecutive number of unsuccessfully tested motors. Specifically, the transducer 14 as shown at station 10 in FIG. 1 projects a light beam across the traveling path of carriage assembly 27. Such a light beam will be intercepted and reflected by reflector assembly 63 when memory arm 61 is in the upper position thereby indicating that motor 36 has successfully completed all preceding tests provided by test facility 1. Reception of the reflected beam by transducer 14 thus actuates the counter 25, as previously described. The transducer 13, on the other hand, also projects a light beam across the traveling path of carriage assembly 27 but is poistioned to be actuated by the reflector assembly 63 when the memory arm 61 is in the lower position. Actuation of transducer 13 in response to reflector assembly 63 operates the counter 23 to register the number of consecutive unsuccessful motor tests. As previously described, counter 23 is reset in response to each successful test and is also effective for actuating the alarm 24 in response to a predetermined number of consecutive unsuccessful tests.

The motors 36 upon leaving counting station 10 are removed from testing facility 1 with the successfully tested motors segregated from the unsuccessfully tested motors. The record means or card 75 is removed from the carriage assembly 27 which carries an unsuccessfully tested motor and is preferably attached to the rejected motor to maintain accountability and facilitate repairs.

With reference to FIG. 4, an apparatus is shown which the power conveniently be employed within control console 11 for selectively providing a plurality of presettable electrical outputs. Specifically, such an apparatus may be employed to provide analog signals to control an automatic testing facility such as shown in FIG. 1. The apparatus of FIG. 4 includes a plurality of impedance means which are shown as resistors 77 which are selectively connected to each other and to an electrical power source 76, such as through the operation of a data card reader 19 as illustrated in FIG. 3. In essence, a pair of output terminals 90 and 91 are selectively connected to the power source 76 by a predetermined number of impedance means to provide a predetermined analog signal.

The plurality of impedance means 77 includes a first plurality of impedance means 92 which are illustrated as a plurality of resistive elements serially connected and having a plurality of junctions or first impedance points such as at 93 between adjacent elements. A second plurality of impedance means 94 are shown constructed similar to the first impedance means 92 and also provide a plurality of second impedance points such as at 95. A third plurality of impedance means 96 are shown constructed similar to the first impedance means 92 and also provide a plurality of third impedance points such as at 97. A fourth plurality of impedance means 98 are shown constructed similar to the first impedance means 92 and also provide a plurality of fourth impedance points such as at 99. A fifth plurality of impedance means 100 are shown constructed similar to the first impedance means 92 and also provide a plurality of fifth impedance points such as at 101. A sixth plurality of impedance means 102 are shown constructed similar to the first impedance means 92 and also provide a plurality of sixth impedance points such as at 103. A seventh plurality of impedance means 104 are shown constructed similar to the first impedance means 92 and also provide a plurality of seventh impedance ponts such as at 105.

A circuit connecting means is provided for connecting the plurality of impedance means selectively to each other and to an input and output means. The plurality of impedance points, such as 93, 95, 97, 99, 101, 103 and 105, each have a corresponding pin or tap such as illustrated at 93a adapted to provide electrical contact should they happen to come into contact with a brush, as commonly employed with data card readers. Specifically, a first brush 106 is electrically connected to the first impedance element 107 of the fourth impedance means 98. A second brush 108 is electrically connected to the first impedance element 109 of the fifth impedance means 100. A third brush 110 is connected to an output means 111 which, in turn, is connected to output terminal 90. A fourth brush 112 is electrically connected to a first impedance element 113 of the sixth impedance means 102. A fifth brush 114 is electrically connected to a first impedance element 115 of the seventh impedance means 104. A sixth brush 116 is connected to an input lead 117 which, in turn, is connected to an output lead 118 of power source 76. A seventh brush 119 is connected to an input lead 120 which, in turn, is connected to an output lead 121 of power source 76.

The first impedance element 122 of the first impedance means 92 is shown electrically connected to the first impedance element 123 of the third impedance means 96 while the first impedance element 124 of the second impedance means 94 is electrically connected to the last impedance element 125 of the third impedance means 96.

In a preferred embodiment, the first through seventh impedance means are positioned parallel to one another to form first through seventh columns, respectively, to permit convenient use in a standard data card reader.

With reference to FIG. 5, a portion of a data card 126 is shown having a conventional construction with eighty columns each having ten pin or code locations designated thereon from 0 to 9. The data card 126 is employed in a preferred embodiment of the invention to selectively code connect the plurality of brushes to the power source 76, the output means 111, and to code predetermined impedance points through corresponding pins or taps. The columns of data card 126 are utlizing in control console 11 in the following manner: columns 1-18 are reserved for future use; seven columns of columns 19-27 are utilized with a resistive band such as shown in FIG. 4 for supplying an analog signal to set the upper current limit for the high voltage starting test at station 5; columns 28-34 are employed with a resistive bank such as shown in FIG. 4 for supplying an analog signal which sets the starting current for the low voltage starting test at station 7; columns 35, 36, 37, 39 and 40 are utilized with a five column resistor bank similar to that shown in FIG. 4 for providing an analog signal to set the voltage for the low voltage starting test at station 7; column 38 is utilized for providing a control signal to select the current range utilized in the low voltage starting test at station 7; columns 41-64 are utilized to provide a model number readout as shown at 21 in FIG. 2 which indicates the type of apparatus being tested; columns 67-73 are utilized with a resistive circuit such as shown in FIG. 4 for providing an analog signal to set the minimum current level for the variable performance test at station 8; and columns 74-80 are employed with a resistive circuit such as shown in FIG. 4 for providing an analog signal to set the maximum level of power supplied to the variable performance test at station 8.

An example of the employment of columns 19-25 of data card 126 is illustrated in FIG. 5 with perforations provided in pin position 2 of column 19, pin position 7 of column 20, pin position 4 of column 21, pin position 5 of column 22, pin position 6 of column 23, pin position 3 of column 24, and pin position 2 of column 25.

Employment of data card 126 with the card reader 19 shown in FIG. 4 is such that columns 19-25 of data card 126 coincide and align with the first through seventh columns of impedance means, namely 92, 94, 96, 98, 100, 102 and 104. The plurality of brushes, namely 106, 108, 110, 112, 114, 116 and 119, are also aligned with the corresponding columns 19-25 of data card 126 and with columns 92-104 of the plurality of impedance means. Specifically, the data card 126 is aligned such that the pins or taps which are connected to the impedance points of the impedance means 77 engage and enter the perforations in columns 19-25 of the data card to selectively make an electrical connection with the brushes in accordance with the predetermined coded perforation locations.

As an example, employment of the coded card 126 of FIG. 5 with the code reader 19 in FIG. 4 would selectively code connect the brushes to the impedance means as follows: pin 93a with brush 106, pin 95a with brush 108, pin 97a with brush 110, pin 99a with brush 112, pin 101a with brush 114, pin 103a with brush 116 and pin 105a with brush 119.

The preferred embodiment of the impedance means 77 employs resistive elements for the plurality of impedance means with certain resistive elements or groups of resistive elements differing in resistive value from other elements or groups of elements. Specifically, a highly satisfactory embodiment has been found to exist with the resistive elements of the first and second impedance means 92 and 94 having 50 ohms each, the elements of the third impedance means 96 having 500 ohms each, the elements of the fourth and fifth impedance means 98 and 100 having 5 ohms each, and the elements of the sixth and seventh impedance means 102 and 104 having one-half ohm each.

It can therefore readily be seen that a particularly novel interconnection exists between impedance elements of the plurality of impedance means which are shown in columns and the plurality of brushes through th coded perforations provided in the data card 126 which, in essence, provides a presettable voltage dividing circuit for supplying a very large number of preselected analog signals.

In accordance with the example given by the coded data card 126, one electrical circuit exists from the output menas 111 through brush 110, pin 97a, impedance point 97, two impedance elements of the third impedance means 96 including element 123, six impedance elements of the first impedance means 92 including the element 122, the impedance point 93, the pin 93a, the brush 106, four impedance elements of the fourth impedance means 98 including element 107, the impedance point 99, the pin 99a, the brush 112, two impedance elements of the sixth impedance means 102 including element 113, impedance point 103, pin 103a, brush 116 to the power source 76 through the input lead 117 and output lead 118. Another electrical circuit exists as provided by the card 126 from the output means 111 through brush 110, pin 97a, impedance point 97, seven impedance elements of the third impedance menas 96 including element 125, three impedance elements of the second impedance means 94 including element 124, impedance point 95, pin 95a, brush 108, five impedance elements of the fifth impedance means 100 including element 109, impedance point 101, pin 101a, brush 114, seven elements of the seventh impedance means 104 including element 115, impedance point 105, pin 105a, brush 119 to the power source 76 through the input lead 120 and the output lead 121.

FIG. 6 illustrates the precise voltage dividing nature of the above example utilizing data card 126 with the left column summing the resistive effect for the first circuit above described between the output means and the power source with the right column summing the resistive effect of the latter circuit The chart of FIG. 6 specifically illustrates the summation of ohmic values for each of the impedance means and also sums the total impedance of the two circuits which have been selectively interconnected by data card 126. The first circuit provided by impedance means 92, 96, 98 and 102 totals 1,321.0 ohms while the second circuit provided by impedance means 94, 96, 100 and 104 totals 3,678.5 ohms. An equivalent circuit of the selective connection of predetermined impedance points to the brushes is shown in FIG. 7 thus illustrating the voltage divider nature of the example provided by data card 126. The selective coded connections provided between the preselected impedance points in each impedance means and the corresponding brushes can therefore radically vary the impedance ratio between the two circuits for providing a plurality of presettable electrical outputs.

The employment of a plurality of impedance means 77 with the data card reader 19 has been found to provide highly satisfactory results for providing a plurality of presettable analog control signals for use in an automatic motor testing facility.

Various modes of carrying out the invention are contemplated as being within the scope of the following claims which particularly point out and distinctly claim the subject matter which is regarded as the invention.

We claim:

1. An automatic apparatus for performing a plurality of electrical tests on an article, including
   a plurality of test stations,
   a carrier means for moving said article to said stations,
   a control means electrically connected to said carrier means for selectively providing the plurality of tests on said article,
   a memory means connected to said carrier means and operatively connected to said control means including a memory element having at least two levels of memory with one of said memory levels operative for selectively initiating said tests on said articles and the second level for bypassing a test, and
   a memory control means connected to at least one of said stations and electrically connected to said control means for selectively transferring said memory means from one memory level to another memory level in response to one of the operations on said article.

2. The apparatus of claim 1, and including
   a record means removably connected to said carrier means, and
   a marking means connected to at least one of said stations and electrically connected to said control means for selectively establishing a record on said record means in response to the operation of said memory control means.

3. An automatic apparatus for performing a plurality of electrical tests on a plurality of articles, including
   a plurality of test stations,
   a plurality of carrier means for moving said articles to said stations,
   a control means electrically connected to said carrier means for selectively providing the plurality of tests on said articles,
   a plurality of memory means connected respectively to said plurality of carrier means and operatively connected to said control means, each of said memory means including a memory element having at least two levels of memory with one of said memory levels operative for initiating said tests on said article and the second level for bypassing a test, and
   a memory control means connected to at least one of said stations and electrically connected to said control means for selectively transferring said memory means from one memory level to another memory level in response to an operation on one of said articles.

4. The apparatus of claim 3, and including
   a tabulating means operatively connected to said plurality of memory means for counting the number of memory level transfers.

5. An automatic apparatus for performing a plurality of tests on an electric motor, including
   a plurality of motor testing stations,
   a carrier means for moving said electric motor to said stations,
   a test control means electrically connected to said carrier means for selectively providing the plurality of tests on said electric motor,
   a memory means connected to said carrier means and operatively connected to said test control means including a memory element having a first memory level for initiating a motor test and a second memory level for by-passing a motor test, and
   a memory control means connected to at least one of said motor testing stations and electrically connected to said test control means for selectively transferring said memory means between the first memory level and the second memory level in response to the test results of said electric motor.

6. The apparatus of claim 5, and including
   a record means removably connected to said carrier means, and
   a marking means connected to at least one of said stations and operatively connected to said test control means for selectively establishing a record of the test results on said record means in response to the operation of said memory control means.

7. The apparatus of claim 5, and including
   a plurality of carrier means for moving a plurality of electric motors to be tested to said stations, said test control means electrically connected to said plurality of carrier means for selectively providing the plurality of tests on said plurality of electric motors,
   a plurality of memory means each connected respectively to a corresponding one of said plurality of carrier means and operatively connected to said test control means, each of said memory means including a memory element having a first memory level and a second memory level, and a plurality of memory control means connected to said plurality of motor testing stations and electrically connected to said test control means for selectively transferring said memory means between the first memory level and the second memory level in response to the testing results of said electric motors at each of said stations.

8. The apparatus of claim 7, and including
a tabulating means operatively connected to said plurality of memory means for counting the number of memory level transfers.

9. An automatic apparatus for testing an electric motor including
a continuous closed-loop track having an electrical energy transferring circuit connected therewith,
a plurality of motor testing stations defined at preselected locations on said track,
a carrier apparatus movably connected to said track for carrying said electric motor to said testing stations and including conductive means for selectively electrically connecting said motor to said electrical track circuit,
a test control means electrically connected to said electrical track circuit for selectively providing a plurality of tests on said electric motor,
a memory arm pivotally connected to said carrier apparatus having a reflector assembly connected thereto, said arm having an upper position and a lower position,
a plurality of photoelectric transducers located at said plurality of testing stations and electrically connected to said test control means and positioned to be selectively actuated by said reflector assembly with said arm in the upper position for initiating a testing sequence at each corresponding station, and
a plurality of memory arm control means located at said plurality of testing stations and electrically connected to said test control means for selectively transferring said arm between said upper and lower positions in response to the test results of said electric motor.

10. The automatic testing apparatus of claim 9, wherein
a portion of said memory arm provides an electrical conductor, and said carrier apparatus including a pair of electrical contacts spring-biased toward each other and adapted to receive said memory arm portion with said arm in the upper position, said pair of contacts and said arm portion connected to said conductive means for completing the electrical circuit between said motor and said electrical track circuit with said arm in said upper position and disconnecting said circuit with said arm in the lower position.

11. The automatic testing apparatus of claim 9, wherein said memory arm control means are located at the terminating end of said testing stations and each of said memory arm control means includes a retractable piston having a projection positioned within the traveling path of said memory arm, said piston being retracted in response to said test control means upon the conclusion of a successful test to allow said memory arm to pass to the succeeding test station in said upper position.

12. The automatic testing apparatus of claim 9, and including
a record card removably connected to said carrier apparatus, and
a plurality of stamping pistons located at said plurality of testing stations and operatively connected to said test control means with each of said pistons having an axially movable punch connected thereto and adapted to selectively perforate said record card at a preselected location in response to a test failure at a corresponding test station.

13. The automatic testing apparatus of claim 9, and including
a pass and a failure photoelectric transducers located adjacent to said closed-loop track and adjacent to the terminating end of the final testing sequence and electrically connected to said test control means, said transducers selectively actuated by said reflector assembly in accordance with the positioning of said memory arm in said upper or lower positions respectively.

14. The automatic testing apparatus of claim 13, wherein said automatic testing apparatus includes a plurality of said carrier apparatus mounted for sequential movement around said track and each of said carrier apparatus having said memory arm and reflector assembly, said test control means further including first and seond tabulating counters connected respectively to said pass and failure transducers for providing an indication of the number of said electric motors passing and failing the plurality of tests at said plurality of testing stations.

15. The automatic testing apparatus of claim 14, wherein said second tabulating counter includes an automatically resettable counter for tabulatingthe number of consecutive testing failures up to a predetermined number, said second counter being reset in response to a successful motor test, and
an alarm actuated by said first counter in response to said predetermined number of consecutive testing failures.

* * * * *

UNITED STATES PATENT OFFICE
CERTIFICATE OF CORRECTION

Patent No. 3,758,857        Dated September 11, 1973

Inventor(s) Sylvester Allan Simpson & Howard W. Smith

It is certified that error appears in the above-identified patent and that said Letters Patent are hereby corrected as shown below:

Cover Page
at [73] Assignee:        after "A." delete "D." and insert ---O.---.

Column 10, Line 22        after "which" delete "the power" and insert ---may---.

Column 11, Line 39        after "are" delete "utilizing" and insert ---utilized---.

Signed and sealed this 2nd day of April 1974.

(SEAL)
Attest:

EDWARD M. FLETCHER, JR.
Attesting Officer

C. MARSHALL DANN
Commissioner of Patents